United States Patent Office 3,484,396
Patented Dec. 16, 1969

3,484,396
THERMOSETTING COMPOSITION COMPRISING AMINO-FORMALDEHYDE RESIN WITH CELLULOSIC FILLER CONTAINING A HIGH PERCENT OF BETA- AND GAMMA-CELLULOSE
Bo E. O. Gelhaar, Perstorp, Sweden, assignor to Perstorp AB, Perstorp, Sweden
No Drawing. Filed Oct. 7, 1966, Ser. No. 584,977
Int. Cl. C08q 51/14
U.S. Cl. 260—17.3                                                   7 Claims

ABSTRACT OF THE DISCLOSURE

A moulding powder having a thermosetting amino-formaldehyde resin base, such as urea-formaldehyde condensate or melamine-formaldehyde condensate, with a filler of sulfite cellulose having a brightness of 92–93 percent GE and a combined beta- and gamma-cellulose content of 12–20 percent yields articles having improved luster and resistance to discoloration.

---

A technical cellulose called α-cellulose and having a brightness of at least 90 percent GE (TAPPI Standard Method T452m–58, Brightness of Paper and Paperboard) has been used for a long time as a filler in thermosetting amino plastic moulding powders, intended for producing moulded articles in white shades or bright pastel colours. In dark moulding powders also wood meal and the like is used as a filler, but it cannot be used for the bright moulding powder qualities, as the necessary brightness and the transparency of these moulding powders are lost thereby.

Commercial, chemical cellulose consists mainly of partly the chemically well defined substance cellulose and partly a mixture of different polysaccharides and has the common name hemicellulose. In practice the name alpha-cellulose is used for the purest kind of cellulose corresponding to the fraction that is insoluble in 17.5 percent NaOH at 20° C. By the expressions beta- and gamma-cellulose such fractions are included that are soluble in said solvent at said temperature and that mainly correspond to said name hemicellulose. As filler in the bright qualities of moulding powder such cellulose qualities that commercially are called "dissolving powders" have been made standard fillers.

A dissolving powder is characterized by a high proportion of alpha-cellulose. The dissolving powders that contain at least 90–95 percent alpha-cellulose are usually called alpha-cellulose, regardless they also contain other components, especially beta- and gamma-cellulose that may amount to totally 5–10 percent. Alpha-cellulose occurs largely in a crystalline form. In this form the cellulose does not show a maximum affinity to hydrophylic substances such as water soluble condensates of an amine compound and an aldehyde, for example urea-formaldehyde condensate or melamine-formaldehyde condensate.

Now it has been discovered that a moulding powder can be obtained having improved properties in certain respects if a technical cellulose is used as a filler having a higher total proportion of beta- and gamma-cellulose than the dissolving powders called alpha-cellulose which up to now have been used generally as a filler in bright amino moulding powders.

A moulding powder according to the invention shall contain 12–20 percent, preferably at least 15 percent beta- and gamma-cellulose and the rest alpha-cellulose. The main reason that a moulding powder according to the invention shows better floating properties during the moulding is probably the larger reactivity of the beta- and gamma-cellulose and the larger affinity to hydrophylic substrates. Also the surface structure of the pressed articles is improved considerably, which gives a higher lustre, and improved resistance to discolouration and the like. By experiments with cellulose types containing between 16–18 percent beta- and gamma-cellulose and the rest alpha-cellulose very good results were obtained.

EXAMPLE

To produce a moulding powder according to the invention 130 kg. of a 57 percent urea-formaldehyde condensate was mixed with 37 kg. sulphite cellulose having a brightness of 92–93 percent GE and a total proportion of beta- and gamma-cellulose amounting to 16 percent. The mixture was worked up until a uniform distribution and impregnation of the cellulose was attained. Afterwards the mixture was dried in a well-known way for example in a rotary drum drier until the dry proportion had increased to about 95 percent. The dried material was ground in a ball mill together with pigment, stabilizer and hardener until a sufficient distribution and fine grinding had been attained whereupon the fine ground powder was granulated. The moulding powder so obtained had substantially improved properties compared with a corresponding powder containing a commercial cellulose, i.e. an alpha-cellulose of about 90–95 percent as a filler.

I claim:
1. Thermosetting molding powder for production of of white or light-colored plastic articles consisting essentially of a thermosetting condensation product of an amino compound and an aldehyde and cellulose having a brightness of at least 90 percent GE and a total content of beta-cellulose and gamma-cellulose of 12–20 percent.
2. A thermosetting molding powder as set forth in claim 1 in which the condensation product is urea-formaldehyde or melamine-formaldehyde.
3. A thermosetting molding powder as set forth in claim 1 in which the cellulose is a sulfite cellulose having a brightness of 92–93 percent GE and a total content of beta-cellulose and gamma-cellulose of 16 percent.
4. A thermosetting molding powder as set forth in claim 3 in which the condensation product is urea-formaldehyde.
5. A thermosetting molding powder as set forth in claim 4 containing about 74 parts of weight by condensation product and 37 parts by weight of cellulose.
6. An article molded from the powder according to claim 1.
7. An article molded from the powder according to claim 5.

References Cited
UNITED STATES PATENTS

| | | | |
|---|---|---|---|
| 1,964,772 | 7/1934 | Schur et al. | 260—17.3 |
| 2,373,362 | 4/1945 | Walter | 260—17.3 |
| 2,652,375 | 9/1953 | Cordier et al. | 260—17.3 |

WILLIAM H. SHORT, Primary Examiner
E. WOODBURY, Assistant Examiner